US008017216B2

(12) United States Patent
Kato et al.

(10) Patent No.: US 8,017,216 B2

(45) Date of Patent: Sep. 13, 2011

(54) MEMBER FOR PUSH BUTTON SWITCH AND METHOD OF MANUFACTURING THE SAME

(75) Inventors: Katsuhiko Kato, Tokyo (JP); Hideto Taneyama, Tokyo (JP); Hitoshi Uchiyama, Tokyo (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 777 days.

(21) Appl. No.: 11/780,188

(22) Filed: Jul. 19, 2007

(65) Prior Publication Data

US 2008/0032095 A1 Feb. 7, 2008

(30) Foreign Application Priority Data

Aug. 2, 2006 (JP) ................................ 2006-210948

(51) Int. Cl.
*B32B 3/24* (2006.01)
*H01H 13/702* (2006.01)

(52) U.S. Cl. ........ 428/131; 428/139; 200/512; 200/514; 200/520

(58) Field of Classification Search .................. 428/131, 428/139; 200/512, 514, 520
See application file for complete search history.

(56) References Cited

U.S. PATENT DOCUMENTS 4,775,574 A * 10/1988 Fukushima et al. .......... 428/209
2006/0042924 A1* 3/2006 Ito ................................ 200/512

FOREIGN PATENT DOCUMENTS

| | | | |
|---|---|---|---|
| EP | 1 484 778 | A2 | 12/2004 |
| JP | 2004-227867 | A | 8/2004 |
| JP | 2004-227867 | A | 8/2004 |
| JP | 2005-190849 | | 7/2005 |
| WO | WO 2004-112069 | | 12/2004 |
| WO | 2005/079120 | A1 | 8/2005 |
| WO | 2005/098884 | A1 | 10/2005 |
| WO | 2005/109460 | A1 | 11/2005 |

OTHER PUBLICATIONS

Some of the above references were cited in a Aug. 13, 2009 European Search Report of the counterpart European Patent Application No. 07791096.6.

* cited by examiner

*Primary Examiner* — William P Watkins, III
(74) *Attorney, Agent, or Firm* — Cowan, Liebowitz & Latman, P.C.; Mark Montague, Esq.

(57) ABSTRACT

A member for a push button switch that has a small thickness, high durability, and excellent click feeling and can be manufactured at low cost. The member for the push button switch includes one or more key tops, a metal sheet including at least holes that correspond to positions of the key tops, and an elastic sheet that is provided on the metal sheet so as to be positioned on the same side as or opposite side to the key tops. The elastic sheet is fitted into the holes and comes in contact with the key tops at positions of the holes. The elastic sheet includes a urethane film or polycarbonate, and a silicone rubber, which are laminated in a thickness direction of the metal sheet.

6 Claims, 11 Drawing Sheets

MEMBER FOR PUSH BUTTON SWITCH AND METHOD OF MANUFACTURING THE SAME

CLAIM OF PRIORITY

This application claims the benefit of Japanese Patent Applications No. 2006-210948, filed on Aug. 2, 2006, the entire contents of which are hereby incorporated by reference herein.

BACKGROUND OF THE INVENTION

1. Field of the Invention

The present invention relates to a member for a push button switch that is suitable for a push button switch of electronic devices, and a method of manufacturing the member.

2. Description of the Related Art

In recent years, reduction in size and thickness has been required for electronic devices such as mobile phones and personal digital assistants (PDAs). Therefore, reduction in size and thickness has also been required for members for push button switches, which are used in operational portions of the electronic devices. Accordingly, a distance between upper and lower surfaces of a member for a push button switch is considerably reduced. For this reason, a metal frame, which has a smaller thickness and higher rigidity as compared to a resin frame, has been used.

A member for a push button switch needs to have a small thickness and high rigidity. Accordingly, a member for a push button switch used in a push button switch of electronic devices is for example, manufactured using the following method. First, through-holes and/or notches are formed in the surface of a hard base, which is formed of a rigid plate such as a hard resin plate or a metal plate. Then, the through-holes and/or notches are plugged using pad members made of rubber or a thermoplastic elastomer. Therefore, a keypad where pressing and floating portions of the pad members are integrated is manufactured. Subsequently, a key top is disposed on the surface of each pad member opposite to the pressing portion through an adhesive layer interposed therebetween. In this way, the member for the push button switch is manufactured (for example, refer to International Patent Publication No. WO2004/112069).

Further, there has been known a member for a push button switch manufactured using the following method. First, a reinforcing member is made using a hard resin by a die forming such as an injection molding, and a metal layer is formed on a portion of the reinforcing member, which comes in contact with an elastic member. Subsequently, the reinforcing member having the metal layer is moved into a cavity of a mold, and silicone rubber forming the elastic member is injected to perform a die forming. Accordingly, a base sheet where the elastic member and reinforcing member are integrated is obtained. Subsequently, a key top is fixed to the base sheet through an adhesive layer. As a result, the member for the push button switch is manufactured (for example, JP-A-2005-190849).

However, the conventional member for the push button switch has the following problems. In the case of the member for the push button switch disclosed in International Patent Publication No. WO2004/112069, the pad member having the floating portion to which the key top is fixed is mainly made of the single substance of silicone rubber or a thermoplastic elastomer. When the pad member is made of the simple substance of silicone rubber and the thickness of the floating portion is too small (for example, 0.2 mm or less), there is a problem that the floating portion is broken if the key top of a push button is pulled by mistake. Further, when the pad member is made of the simple substance of a thermoplastic elastomer having high strength, for example, the simple substance of a urethane-based elastomer, it is possible to make a key pad thinner. When the pad member is made of the thermoplastic elastomer, the pad member is generally manufactured using an injection molding. However, the flow property of the thermoplastic elastomer is poor as compared to that of liquid silicone rubber. For this reason, there are problems that the dimensional stability, which is required to form a thin film, of the thermoplastic elastomer is poor and yield is low. In addition, when the operation of the push button is repeated for a long term, the key pad is deformed due to a pressing force. For this reason, there is a problem that click feeling deteriorates.

Meanwhile, the member for the push button switch disclosed in JP-A-2005-190849 also has the same problems as the member for the push button switch disclosed in International Patent Publication No. WO2004/112069. Accordingly, it is difficult to reduce the thickness of the member for the push button switch. In addition, when the base sheet is formed, the reinforcing member having a previously-molded metal layer is disposed in the cavity of the mold and then needs to be molded again. For this reason, it takes a lot of time. Therefore, there are problems that manufacturing processes become troublesome, manufacturing cost increases, and productivity deteriorates.

SUMMARY OF THE INVENTION

The present invention has been made to solve the above-mentioned problems, and it is an object of the present invention to provide a member for a push button switch that has a small thickness, high durability, and excellent click feeling and can be manufactured at low cost, and a method of manufacturing the member.

In order to achieve the above-mentioned object, according to an aspect of the present invention, a member for a push button switch includes one or more key tops, a metal sheet including at least holes that correspond to positions of the key tops, and an elastic sheet that is disposed on the metal sheet so as to be positioned on the same side as or opposite side to the key tops. The elastic sheet is fitted into the holes and comes in contact with the key tops at positions of the holes. The elastic sheet includes a urethane film and a silicone rubber, which are laminated in a thickness direction of the metal sheet.

According to the member for the push button switch having the above-mentioned structure, it is possible to make the thickness of the member for the push button switch smaller than the conventional thickness limitation, and to improve the durability of the member for the push button switch. That is, since the elastic sheet where the urethane film and the silicone rubber are integrated is formed, it is possible to further reduce the thickness of the member and to secure sufficient strength and flexibility for click feeling. In addition, since the metal sheet is used as a reinforcing member, it is possible to reduce the thickness of the member for the push button switch and to improve the rigidity of the entire member for the push button switch.

Further, in the above-mentioned member, the elastic sheet may be interposed between adjacent key tops so as to form partitions. Accordingly, it is possible to perform a decorative treatment on the partitions interposed between adjacent key tops. As a result, it is possible to improve the visibility and decoration of the member for the push button switch and to reinforce the member for the push button switch by the partitions.

Furthermore, in the above-mentioned member, a decorative layer may be provided between the urethane film and silicone rubber. Accordingly, since the decorative layer is provided between the urethane film and the silicone rubber, it is possible to improve the visibility and decoration of the member for the push button switch like the above-mentioned member. As a result, it is possible to reduce the thickness of the member, to improve the durability of the member, and to respond to the demand on the various designs.

In addition, in the above-mentioned member, a decorative frame may be formed on the metal sheet or the elastic sheet so as to be positioned outside the key tops. Accordingly, it is possible to improve the visibility and decoration of the member for the push button switch like the above-mentioned member, and to reinforce the member for the push button switch by the decorative frame. As a result, it is possible to obtain good appearance and expensive-looking, and to provide members for push button switches having various designs.

Further, in the above-mentioned member, a light-emitting member may be disposed below the key tops. Accordingly, it is possible to reduce the thickness of the member for the push button switch, and to obtain high brightness and uniform illumination. As a result, it is possible to obtain a member for an illumination type push button switch that improves the visibility of key tops in the dark.

Furthermore, in the above-mentioned member, a part of peripheral portions of the metal sheet may be bent in a direction opposite to the key tops. Accordingly, it is possible to easily combine the member for the push button switch with electronic devices, and to widely use the member for the push button switch, which is obtained from the present invention, in various fields.

In addition, according to another aspect of the present invention, a member for a push button switch includes one or more key tops, a metal sheet including at least holes that correspond to positions of the key tops, and an elastic sheet that is disposed on the metal sheet so as to be positioned on the same side as or opposite side to the key tops. The elastic sheet is fitted into the holes and comes in contact with the key tops at positions of the holes. The elastic sheet includes a polycarbonate film and a silicone rubber, which are laminated in a thickness direction of the metal sheet.

Further, in the above-mentioned member, the elastic sheet is interposed between adjacent key tops so as to form partitions. Accordingly, it is possible to perform a decorative treatment on the partitions interposed between adjacent key tops. As a result, it is possible to improve the visibility and decoration of the member for the push button switch and to reinforce the member for the push button switch by the partitions.

Furthermore, in the above-mentioned member, a decorative layer may be provided between the polycarbonate film and silicone rubber.

Further, in the above-mentioned member, a decorative frame may be formed on the metal sheet or the elastic sheet so as to be positioned outside the key tops.

Furthermore, in the above-mentioned member, a light-emitting member may be disposed below the key tops.

In addition, in the above-mentioned member, a part of peripheral portions of the metal sheet may be bent in a direction opposite to the key tops.

Even though a polycarbonate film is used instead of the urethane film as described above, it is possible to obtain the same operation and effect as the member for the push button switch using a urethane film.

In addition, according to another aspect of the present invention, a method of manufacturing a member for a push button switch includes attaching a urethane film to a metal sheet; forming holes, which correspond to positions of one or more key tops and pass through the metal sheet, in the metal sheet; forming a silicone rubber on the surface of the urethane film, and putting an elastic sheet, which includes the urethane film and the silicone rubber, into the holes; and attaching the key tops to the elastic sheet at positions of the holes.

If the above-mentioned method is used, it is possible to easily manufacture a cover member for a push button switch, which can be used for a long term and has a small thickness, at low cost. One or more holes are formed in the metal sheet. The holes are on the positions corresponding to one or more key tops and pass through the metal sheet. The silicone rubber is formed on the surface of the urethane film attached to the metal sheet. Then, an elastic sheet, which is formed of the urethane film and the silicone rubber, is put into the holes. As a result, the metal sheet and the elastic sheet can be integrally molded. Therefore, it is possible to obtain the member for the push button switch, which has a small thickness, sufficient strength, and flexibility for click feeling. Further, when holes are formed in the metal sheet, the holes may be formed using a method that includes attaching a urethane film to a metal sheet, and performing etching or punching on the surface of the metal sheet opposite to the surface to which the urethane film is attached. Alternatively, the holes may be formed using a method of forming holes in a metal sheet, and attaching a urethane film to one surface of the metal sheet.

Further, according to another aspect of the present invention, a method of manufacturing a member for a push button switch includes forming holes, which correspond to positions of one or more key tops and pass through a metal sheet, in the metal sheet; disposing a urethane film on the metal sheet; providing liquid silicone rubber on the urethane film; performing a molding while the metal sheet, the urethane film, and the liquid silicone rubber are superimposed in this order, and putting an elastic sheet, which includes the urethane film and the silicone rubber, into the holes of the metal sheet; and attaching the key tops to the elastic sheet at positions of the holes.

Even when the above-mentioned method is used, it is possible to easily manufacture a cover member for a push button switch, which can be used for a long term and has a small thickness, at low cost. One or more holes are formed in the metal sheet. The holes are on the positions corresponding to one or more key tops and pass through the metal sheet. Further, a molding is performed while the metal sheet, the urethane film, and liquid silicone rubber are superimposed in this order. Then, the elastic sheet is put into the holes of the metal sheet. As a result, the metal sheet and the elastic sheet can be integrally molded. Therefore, it is possible to obtain the member for the push button switch, which has a small thickness, sufficient strength, and flexibility for click feeling.

Furthermore, according to another aspect of the present invention, a method of manufacturing a member for a push button switch includes forming holes, which correspond to positions of one or more key tops and pass through a metal sheet, in the metal sheet; providing liquid silicone rubber on a urethane film; performing a molding while the liquid silicone rubber exists on the urethane film, laminating the urethane film and the silicone rubber, and forming an elastic sheet that includes convex portions at positions corresponding to the holes; attaching the elastic sheet to the metal sheet so that the convex portions correspond to the holes of the metal sheet; and attaching the key tops to the elastic sheet at positions of the holes.

Even when the above-mentioned method is used, it is possible to easily manufacture a cover member for a push button switch, which can be used for a long term and has a small thickness, at low cost. One or more holes are formed in the metal sheet. The holes are on the positions corresponding to one or more key tops and pass through the metal sheet, and a molding is performed on the urethane film and liquid silicone rubber in order to form an elastic sheet that includes the convex portions corresponding to the positions of the holes. Further, the elastic sheet is attached to the metal sheet in order to integrate the metal sheet and the elastic sheet. Therefore, it is possible to obtain the member for the push button switch, which has a small thickness, sufficient strength, and flexibility for click feeling.

In addition, according to another aspect of the present invention, a method of manufacturing a member for a push button switch includes attaching a polycarbonate film to a metal sheet; forming holes, which correspond to positions of one or more key tops and pass through a metal sheet, in the metal sheet; forming a silicone rubber on the surface of the polycarbonate film, and putting an elastic sheet, which includes the polycarbonate film and the silicone rubber, into the holes; and attaching the key tops to the elastic sheet at positions of the holes.

Further, according to another aspect of the present invention, a method of manufacturing a member for a push button switch includes forming holes, which correspond to positions of one or more key tops and pass through a metal sheet, in the metal sheet; disposing a polycarbonate film on the metal sheet; providing liquid silicone rubber on the polycarbonate film; performing a molding while the metal sheet, the polycarbonate film, and the liquid silicone rubber are superimposed in this order, and putting an elastic sheet, which includes the polycarbonate film and the silicone rubber, into the holes of the metal sheet; and attaching the key tops to the elastic sheet at positions of the holes.

Furthermore, according to another aspect of the present invention, a method of manufacturing a member for a push button switch includes forming holes, which correspond to positions of one or more key tops and pass through a metal sheet, in the metal sheet; providing liquid silicone rubber on a polycarbonate film; performing a molding while the liquid silicone rubber exists on the polycarbonate film, laminating the polycarbonate film and the silicone rubber, and forming an elastic sheet that includes convex portions at positions corresponding to the holes; attaching the elastic sheet to the metal sheet so that the convex portions correspond to the holes of the metal sheet; and attaching the key tops to the elastic sheet at positions of the holes.

Even though a polycarbonate film is used instead of the urethane film as described above, it is possible to obtain the same operation and effect as the method of manufacturing the member for the push button switch using a urethane film.

The composition, an elastic modulus, and color tone of the material of the key top, which forms the member for the push button switch according to the present invention, are not particularly limited, and the key top may be preferably made of a known polymer resin such as a thermosetting resin. Specifically, the key top may be made of, for example, a polycarbonate resin, an acrylonitrile butadiene styrene resin (ABS resin), an epoxy resin, a phenol resin, an acrylic-based resin, a urethane-based resin, a silicone-based resin, a polyvinyl chloride resin, a polystyrene-resin, a polyarylate resin, a polymethylpentene resin, a polyurethane resin, a polyethylene resin, a polypropylene resin, a polyphenylene ether resin, a polyacetal resin, a polysulfone resin, or a polyetherimide resin. In particular, a polycarbonate resin or an ABS resin among the above-mentioned resins may be preferably used to form the key top in terms of translucency, formability, surface conditions, and ornamental properties after molding. However, the above-mentioned resins are only examples, and other resin materials may be used as the material of the key top. Further, the key top may be made of one kind of a resin or a mixture of two kinds of resins. Meanwhile, the key top, which forms the member for the push button switch according to the present invention, may be made of a metal material. For example, the key top may be made of metal, such as stainless steel, aluminum, magnesium, copper, zinc, titanium, or an alloy thereof. It is more preferable that the key top be made of stainless steel.

The metal sheet forming the member for the push button switch according to the present invention may be made of stainless steel, aluminum, magnesium, copper, zinc, titanium, or an alloy thereof. In particular, it is more preferable that the metal sheet be made of stainless steel in terms of machinability and high-corrosion resistance. However, the above-mentioned metal materials are only examples, and other metal materials may be used as the material of the metal sheet.

In the present invention, a molding is a process for forming a specific shape, and the value of the pressure is not considered. Attaching includes a method of integrating objects to be adhered without materials that are interposed between the objects, as well as a method of integrating objects to be adhered through an adhesive or a double-sided tape that is interposed between the objects. Further, the polycarbonate film may include a film that is made of only polycarbonate, and a polymer alloy that is formed of polyester (preferably, polybutylene terephthalate) and polycarbonate.

According to the present invention, it is possible to provide a member for a push button switch that has a small thickness, high durability, and excellent click feeling and can be manufactured at low cost, and a method of manufacturing the member.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PREFERRED EMBODIMENTS

Preferred embodiments of a member for a push button switch and a method of manufacturing the member according to the present invention will be described in detail below with reference to accompanying drawings. However, the present invention is not limited to preferred embodiments to be described below.

First Embodiment

Figure 1:
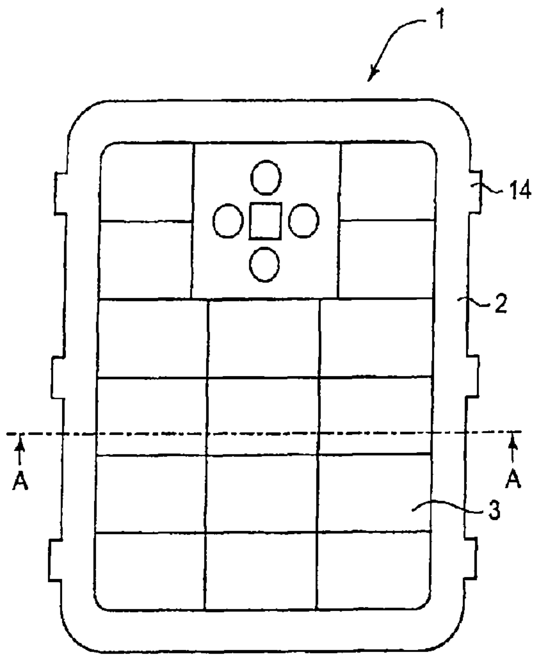
FIG. 1 is a front view of a member for a push button switch according to a first embodiment of the present invention.
Figure 2:
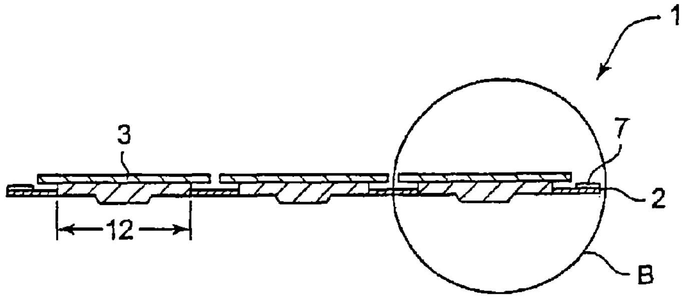
FIG. 2 is a cross-sectional view of the member for the push button switch, taken along a line A-A in FIG. 1.
Figure 3:
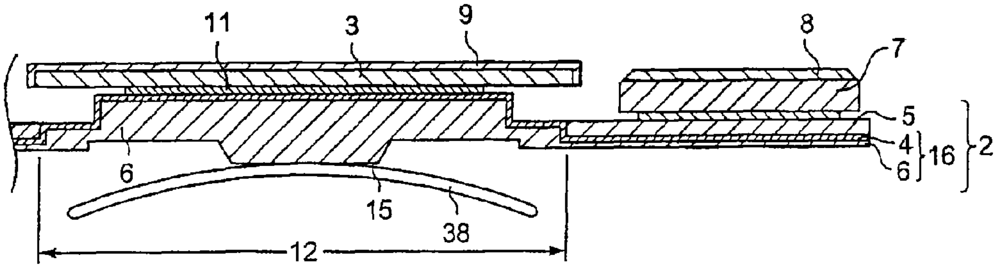
FIG. 3 is an enlarged view of a portion B of the member for the push button switch shown in FIG. 2.

FIG. 1 is a front view of a member for a push button switch 1 according to a first embodiment of the present invention. FIG. 2 is a cross-sectional view of the member for the push button switch 1, taken along a line A-A in FIG. 1. FIG. 3 is an enlarged view of a portion B of the member for the push button switch 1 shown in FIG. 2.

As shown in FIGS. 1 and 2, the member for the push button switch 1 includes a keypad 2, key tops 3 that are disposed on a surface of the keypad 2 and made of a translucent resin, and a decorative frame 7 that is disposed at the peripheral portion of the keypad 2 so as to be positioned outside the key tops 3.

Each of the key tops 3 is preferably made of a polycarbonate resin. However, each of the key tops 3 may be made of a resin other than the polycarbonate resin, for example, an ABS resin. An ornamental layer 9 having marks, such as letters, numerals, or designs, is formed on the surface of each of the key tops 3. Further, a method of forming the ornamental layer 9 is not particularly limited, and the ornamental layer 9 may be formed on the surface of each of the key tops 3 by a known method using ink or paint. Furthermore, in order to improve the fixability, adherence, and coloring property of the ink or paint, it is preferable that various known surface treatments be previously performed on the surface of each of the key tops 3 so as to modify the properties of the surface of each key top 3. In addition, a protective layer made of a transparent resin may be formed on the ornamental layer 9. If the protective layer is formed on the ornamental layer 9, it is possible to effectively protect the ornamental layer 9 from external injuries.

As shown in FIG. 3, the keypad 2 includes a metal sheet 5 having holes 12, a urethane film 4, and a silicone rubber 6. The urethane film 4 and the silicone rubber 6 form an elastic sheet 16. Further, when a gap is formed between adjacent key tops 3, the metal sheet 5 is shown in the appearance of the member for the push button switch 1. For this reason, a surface opposite to the surface of the metal sheet 5, to which the urethane film 4 is attached, may be decorated by plating, painting, or printing. In this case, it is possible to improve the design of the member for the push button switch 1. Portions of the elastic sheet 16 protrude from the holes 12 of the metal sheet 5 so that the urethane film 4 is oriented toward the upper surface of the keypad 2. The key top 3 is attached to each of the protruding portions through an adhesive layer 11. A presser 15, which protrudes in a direction opposite to the key top 3, is formed on a surface of the silicone rubber 6 opposite to the key top 3 at a position corresponding to each hole 12.

The decorative frame 7 is preferably made of a polycarbonate resin. However, the decorative frame 7 may be made of a resin other than the polycarbonate resin. A print layer 8 including letters, figures, or symbols may be formed on the surface of the decorative frame 7. A known method may be used to form the print layer 8. For example, a painting method or a plating method may be used to form the print layer 8.

A method of manufacturing the member for the push button switch 1 according to the first embodiment of the present invention will be described below.

Figure 4:
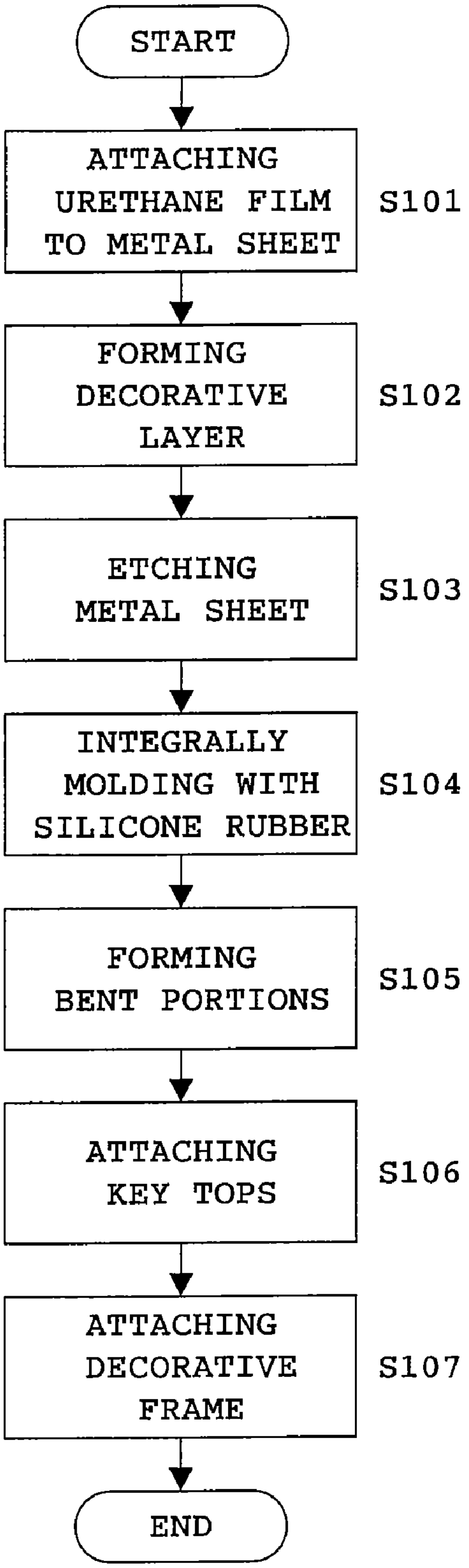
FIG. 4 is a flow chart illustrating steps of a method of manufacturing the member for the push button switch according to the first embodiment of the present invention.

FIG. 4 is a flow chart illustrating steps of a method of manufacturing the member for the push button switch 1 according to the first embodiment of the present invention. FIGS. 5A to 5F are views showing the steps of the method of manufacturing the member for the push button switch 1 according to the first embodiment of the present invention.

Figure 5A:
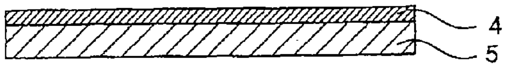
FIGS. 5A to 5F are views showing the steps of the method of manufacturing the member for the push button switch according to the first embodiment of the present invention.

First, the urethane film 4 is attached to the metal sheet 5 (STEP S101). As shown in FIG. 5A, in this embodiment, a primer treatment or the like is performed on one surface of the metal sheet 5 forming the member for the push button switch 1, and the urethane film 4 is then heated and pressed to be attached to the metal sheet 5. However, a method of attaching the urethane film 4 to the metal sheet 5 is not limited to above-mentioned method. For example, an adhesive, which performs an adhesive function at a normal temperature or by heating, may be used to integrate the metal sheet 5 and the urethane film 4. In this case, it is preferable that an adhesion temperature be set to a temperature (120 to 150° C.) higher than a molding temperature of silicone. Further, an attaching method using a double-sided tape or an adhesive may be used to attach the urethane film 4 to the metal sheet 5. Furthermore, the metal sheet 5 may preferably have a thickness in the range of 0.05 to 0.5 mm. More preferably, the metal sheet 5 may have a thickness in the range of 0.1 to 0.2 mm. When the metal sheet 5 has a thickness of 0.05 mm or more, it is possible to secure the rigidity of the entire member for the push button switch 1. When the metal sheet 5 has a thickness of 0.5 mm or less, it is possible to reduce the thickness of the member for the push button switch 1. Meanwhile, the urethane film 4 may preferably have a thickness in the range of 0.03 to 0.2 mm. More preferably, the urethane film 4 may have a thickness in the range of 0.05 to 0.1 mm. When the urethane film 4 has a thickness of 0.03 mm or more, it is possible to reduce the possibility that the urethane film 4 is ruptured due to the shrinkage of the urethane film 4 at the time of the press molding of the silicone rubber 6. When the urethane film 4 has a thickness of 0.2 mm or less, it is possible to reduce the thickness of the member for the push button switch 1. Meanwhile, if the shrinkage of the urethane film 4 increases in the subsequent manufacturing steps, the urethane film 4 may be previously heated and molded using a mold before the molding of the silicone rubber 6. Accordingly, it is possible to uniformly perform a drawing of the urethane film 4, to prevent the color of the decorative print layer printed on the urethane film 4 from becoming pale, to prevent color blurring and color irregularity, and to prevent the rupture of the urethane film 4 that is caused by the molding of the silicone rubber 6 in the subsequent steps.

Figure 5B:
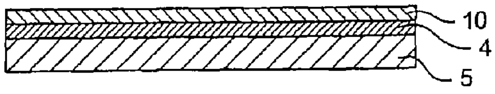

Then, as shown in FIG. 5B, a decorative layer 10 is formed on the surface of the urethane film 4 (STEP S102). In this embodiment, preferably, the decorative layer 10 is screen-printed on the surface of the urethane film 4 with urethane-based ink, polycarbonate-based ink, or polybutylene terephthalate-based ink. The decorative layer 10 decorates the urethane film 4, and improves the adhesion between the silicone rubber 6 and the urethane film 4. Further, a method of forming the above-mentioned decorative layer 10 and a material used to form the decorative layer 10 are not particularly limited, and other materials and methods may be used to form the decorative layer 10. If the decorative layer 10 is formed, it is possible to improve the visibility and decoration of the member for the push button switch 1 and to respond to the demand on the various designs. However, a step of forming the decorative layer 10 is not an essential step. A layer formed of an adhesive or a double-sided tape may be provided instead of the decorative layer 10.

Figure 5C:
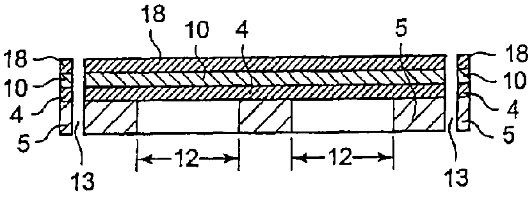

Subsequently, the surface opposite to the surface of the metal sheet 5, to which the urethane film 4 is attached, is etched to form the holes 12 (STEP S103). As shown in FIG. 5C, in this embodiment, the portions of the metal sheet 5 corresponding to the regions of the key tops 3 and the portions of the metal sheet 5 corresponding to positioning holes 13 are etched to preferably form the holes 12 and the positioning holes 13 in the metal sheet 5. In addition, through-holes are formed in the urethane film 4, which remains after etching, at positions corresponding to the positioning holes 13. Since the through-holes are formed, it is possible to secure position accuracy during the manufacturing of the keypad 2. However, the present invention is not limited to the above-mentioned structure, and it is possible to change manufacturing conditions, the material of the metal sheet 5, and the material of the urethane film 4. For example, after a protective film 18 is attached to the surface of the decorative layer 10, etching may be performed. The reason is to reduce the possibility that the urethane film 4 is corroded during etching. However, a method of forming the holes 12 of the metal sheet 5 is not limited to the above-mentioned etching, and the holes of the metal sheet 5 may be formed using another method such as punching, if necessary.

Figure 5D:
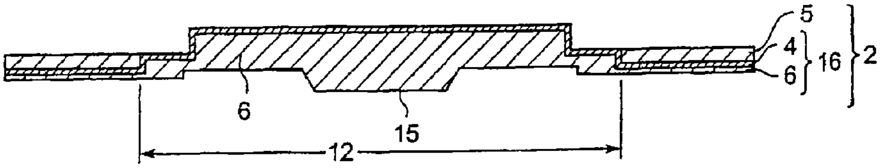

After that, liquid silicone rubber having selective adhesion is applied on the surface of the decorative layer 10, and a compression molding is performed (STEP S104). In this embodiment, since a compression molding of the liquid silicone rubber having selective adhesion is performed as shown in FIG. 5D, it is possible to integrate the keypad 2 that includes the metal sheet 5, the urethane film 4, and the silicone rubber 6. Specifically, after the liquid silicone rubber having selective adhesion is applied on the surface of the decorative layer 10, the compression molding of uncured liquid silicone rubber is performed by using a mold including positioning pins that can be set by being fitted into positioning holes 13 and a recess corresponding to the shape of a product. Accordingly, it is possible to form the elastic sheet 16, in which the urethane film 4 and the silicone rubber 6 are integrated, having the pressers 15.

Subsequently, bent portions 14 of the metal sheet 5 are formed (STEP S105). In this embodiment, a plurality of peripheral portions of the metal sheet 5 is bent toward the back surface of the keypad 2. The bent portions 14 (see FIG. 1) may be formed using a known method, for example, pressing. In addition, the bent portions 14 are not formed in the next step of STEP S104, and may be formed after a subsequent manufacturing step, such as a step of attaching the key top 3 (STEP S106) or a step of attaching the decorative frame 7 (STEP S107). It is not necessary to form the bent portions 14 by all means.

Figure 5E:
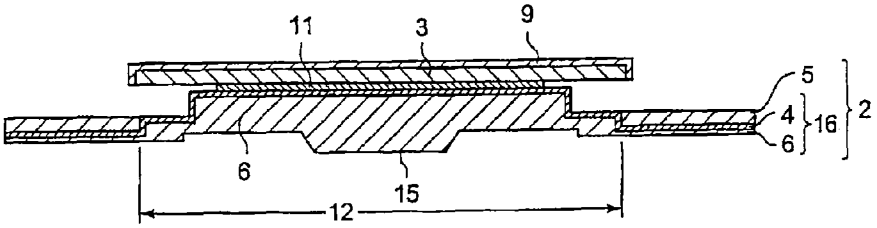

After that, the key top 3 is attached to each of the protruding portions of the elastic sheet 16, which protrude at the holes 12 (STEP S106). As shown in FIG. 5E, in this embodiment, the key top 3 having the ornamental layer 9 is attached to the surface of the urethane film 4 at the position corresponding to each presser 15 through the adhesive layer 11.

Figure 5F:
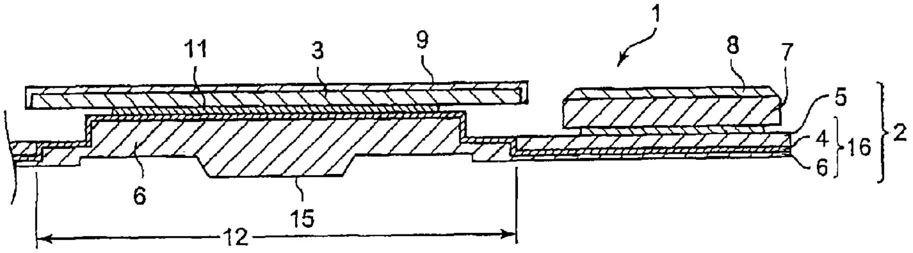

Finally, the decorative frame 7 is attached to the metal sheet 5 (STEP S107). As shown in FIG. 5F, in this embodiment, the decorative frame 7, on which a decorative treatment is previously performed, is attached to the peripheral portion of the keypad 2 by using a double-sided tape so as to be positioned outside the key tops 3. The decorative frame 7 is preferably made of a polycarbonate resin. However, the decorative frame 7 may be made of a resin other than the polycarbonate resin, for example, an ABS resin. Further, a method of forming the print layer 8 is not particularly limited. It is not necessary to form the decorative frame 7 by all means.

Figure 6:
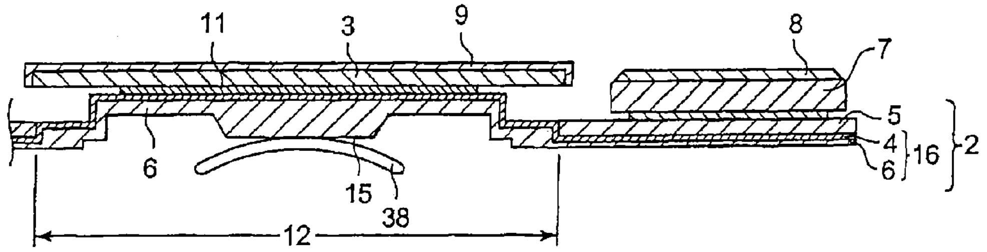
FIG. 6 is a cross-sectional view of a member for a push button switch, which has a structure different from the structure shown in FIG. 3.

FIG. 6 is a cross-sectional view of a member for a push button switch 1, which has a structure different from the structure shown in FIG. 3. As shown in FIG. 6, the bottom surface of the end of a presser 15 may be positioned above the lower surface of an elastic sheet 16. In this case, the entire thickness of the keypad 2 decreases, so that it is possible to further reduce the thickness of the member for the push button switch 1. However, the present invention is not limited to the above-mentioned structure, and the bottom surface of the end of the presser 15 may be formed on the same surface as the lower surface of the elastic sheet 16.

Second Embodiment

A member for a push button switch 20 according to a second embodiment of the present invention will be described below.

The member for the push button switch 20 according to the second embodiment of the present invention includes the same elements as those of the member for the push button switch 1 according to the first embodiment of the present invention. In the description of the following embodiments that includes the second embodiment, the same elements are indicated by the same reference numerals as those of the first embodiment. Further, descriptions to be repeated for the same steps will be omitted.

Figure 7:
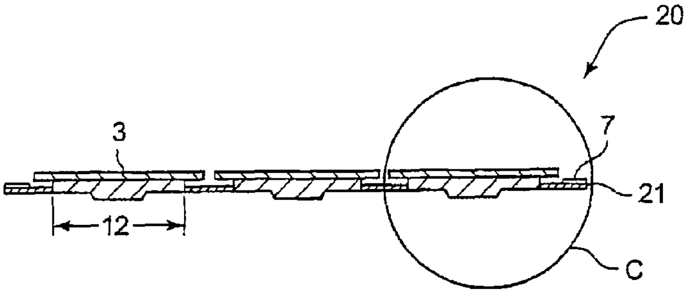
FIG. 7 is a cross-sectional view of a member for a push button switch according to a second embodiment of the present invention, taken along the same line as the line A-A shown in FIG. 1.
Figure 8:
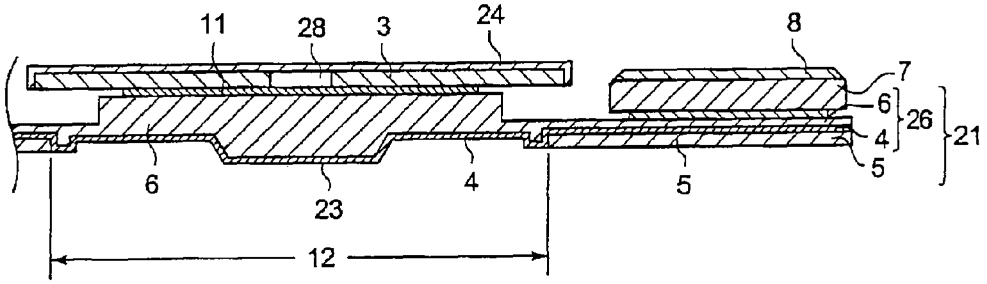
FIG. 8 is an enlarged view of a portion C of the member for the push button switch shown in FIG. 7.

FIG. 7 is a cross-sectional view of a member for a push button switch 20 according to a second embodiment of the present invention, taken along the same line as the line A-A shown in FIG. 1. FIG. 8 is an enlarged view of a portion C of the member for the push button switch 20 shown in FIG. 7.

According to the second embodiment, unlike the first embodiment, a keypad 21 includes a metal sheet 5 having holes 12 and an elastic sheet 26 as shown in FIGS. 7 and 8. Further, portions of the elastic sheet 26 protrude from the holes 12 of the metal sheet 5 so that a urethane film 4 is oriented toward the back surface of the keypad 21. Each of the protruding portions is a presser 23. Meanwhile, the elastic sheet 26 is provided with protrusions at the side opposite to the pressers 23. A key top 3 made of metal is attached to each of the protruding portions through an adhesive layer 11.

The key top 3 may be preferably made of the material of the above-mentioned metal sheet 5. In particular, the key top 3 is preferably made of stainless steel. Further, a through-hole 28 is formed through the key top 3 by a method, such as laser beam machining, pressing, or etching. An ornamental layer 24 having marks indicating functions, such as letters, numerals, or designs, may be formed on the surface of each of the key tops 3, by a machining method, such as blasting or hairlining. In addition, it is preferable that a paint layer made of a transparent resin be formed on the surface of the key top 3 so as to correspond to a region including the through-hole 28. The paint layer is provided to transmit light from the back surface of the key top 3.

A method of manufacturing the member for the push button switch 20 according to the second embodiment of the present invention will be described below.

Figure 9:
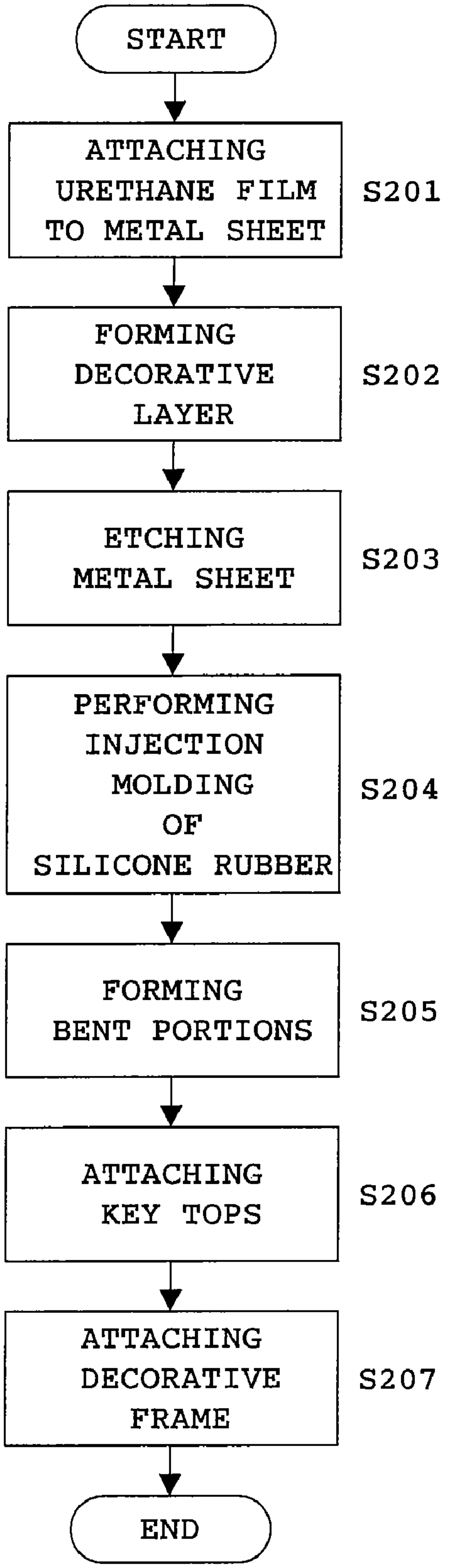
FIG. 9 is a flow chart illustrating steps of a method of manufacturing the member for the push button switch according to the second embodiment of the present invention.
Figure 10A:
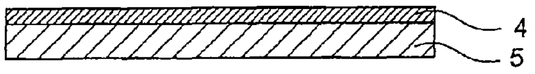
FIGS. 10A to 10F are views showing the steps of the method of manufacturing the member for the push button switch according to the second embodiment of the present invention.
Figure 10B:
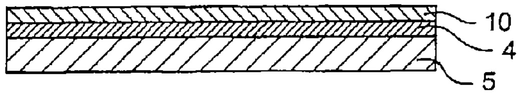
Figure 10C:
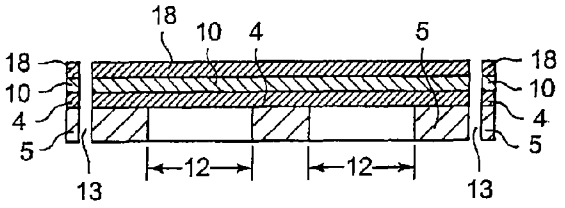

FIG. 9 is a flow chart illustrating steps of a method of manufacturing the member for the push button switch 20 according to the second embodiment of the present invention. FIGS. 10A to 10F are views showing the steps of the method of manufacturing the member for the push button switch 20 according to the second embodiment of the present invention. STEP S201 to STEP S203 shown in FIG. 9 and the steps shown in FIGS. 10A to 10C are the same as STEP S101 to STEP S103 shown in FIG. 4 and the steps shown in FIGS. 5A to 5C. Accordingly, descriptions to be repeated will be omitted.

First, the urethane film 4 is attached to the metal sheet 5 (STEP S201). As shown in FIG. 10A, in this step, the metal sheet 5 and the urethane film 4 are integrated.

Then, as shown in FIG. 10B, a decorative layer 10 is formed on the surface of the urethane film 4 (STEP S202). A layer, which decorates the urethane film 4 and improves the adhesion between a silicone rubber 6 and the urethane film 4, is formed in this step. However, a step of forming the decorative layer 10 is not an essential step.

Subsequently, holes 12 are formed in the metal sheet 5 (STEP S203). As shown in FIG. 10C, in this step, the surface opposite to the surface of the metal sheet 5, to which the urethane film 4 is attached, is etched to form the holes 12.

Figure 10D:
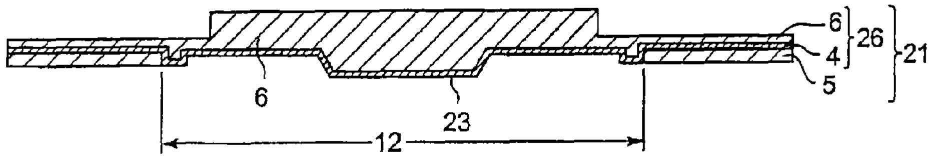

After that, an injection molding of silicone rubber having selective adhesion is performed (STEP S204). As shown in FIG. 10D, in this embodiment, it is possible to preferably integrate the keypad 21, which includes the metal sheet 5, the urethane film 4, and the silicone rubber 6, by the injection molding of the silicone rubber having selective adhesion. Specifically, the metal sheet 5 integrated with the urethane film 4 that is coated on the decorative layer 10 is disposed in an injection mold, which includes positioning pins that can be set by being fitted into positioning holes 13 and a recess corresponding to the shape of a product. Then, the injection molding of uncured liquid silicone rubber is performed. Accordingly, it is possible to form the elastic sheet 26, in which the urethane film 4 and the silicone rubber 6 are integrated, having the pressers 23.

Subsequently, bent portions 14 of the metal sheet 5 are formed (STEP S205). In this embodiment, a plurality of peripheral portions of the metal sheet 5 is bent in a direction opposite to the keypad 21. In addition, the bent portions 14 may be formed after a subsequent manufacturing step, such as a step of attaching the key top 3 (STEP S206) or a step of attaching a decorative frame 7 (STEP S207). It is not necessary to form the bent portions 14 by all means.

Figure 10E:
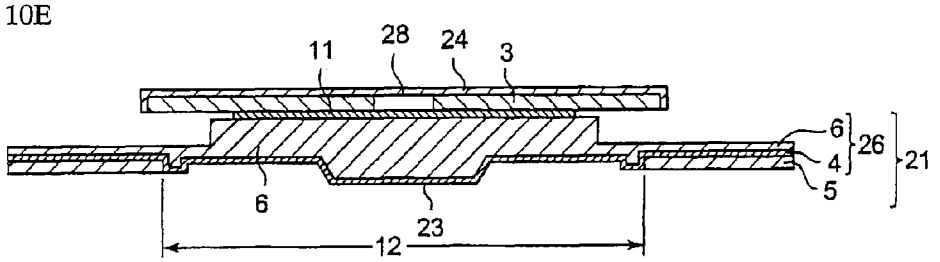

After that, the key top 3 is attached to each of the protruding portions of the elastic sheet 26, which protrude at the holes 12 (STEP S206). As shown in FIG. 10E, in this embodiment, the through-hole 28 is formed through the key top 3 so as to be positioned on the surface of the silicone rubber 6 opposite to each presser 23. The key top 3 having the ornamental layer 24 is attached to the surface of the silicone rubber 6 through the adhesive layer 11.

Figure 10F:
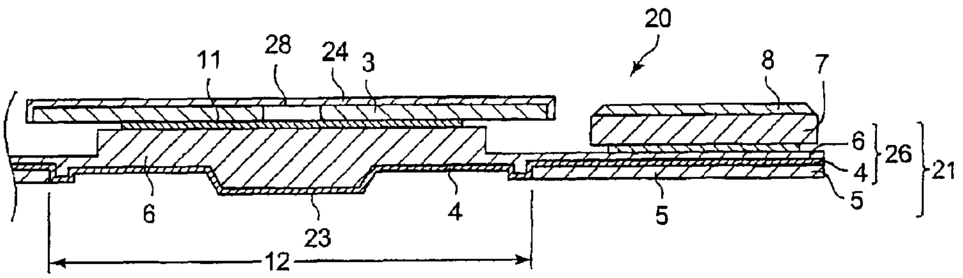

Finally, the decorative frame 7 is attached to the silicone rubber 6 (STEP S207). As shown in FIG. 10F, in this embodiment, the decorative frame 7, on which a decorative treatment is previously performed, is attached to the peripheral portion of the keypad 21 by using a double-sided tape so as to be positioned outside the key tops 3. Further, a method of forming the print layer 8 is not particularly limited.

Third Embodiment

A member for a push button switch 30 according to a third embodiment of the present invention will be described below.

Figure 11:
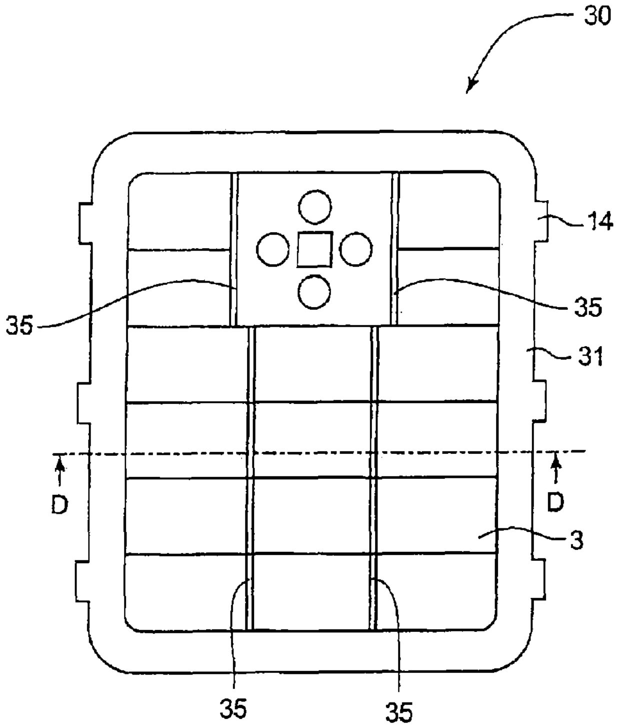
FIG. 11 is a front view of a member for a push button switch according to a third embodiment of the present invention.
Figure 12:
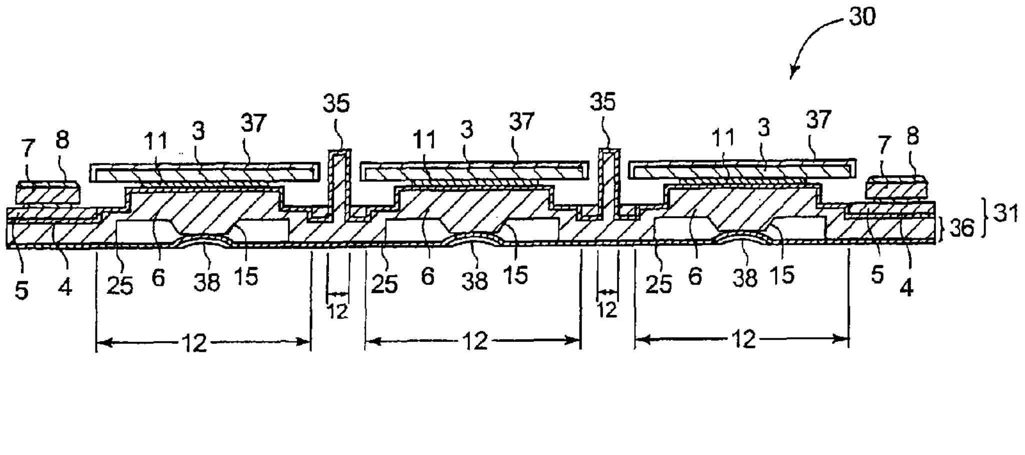
FIG. 12 is an enlarged cross-sectional view of the member for the push button switch, taken along a line D-D in FIG. 11.

FIG. 11 is a front view of a member for a push button switch 30 according to a third embodiment of the present invention. FIG. 12 is an enlarged cross-sectional view of the member for the push button switch 30, taken along a line D-D in FIG. 11.

According to the third embodiment, unlike the first embodiment, a keypad 31 includes a metal sheet 5 having holes 12, an elastic sheet 36, and an electroluminescent sheet 25 that is an example of a light emitting member (hereinafter, referred to as an "EL sheet 25") as shown in FIGS. 11 and 12. The EL sheet 25 is attached to a silicone rubber 6 of the elastic sheet 36. Further, the EL sheet 25 is provided between pressers 15, which are formed of the silicone rubber 6, and metal domes 38 so as to correspond to the shape of the metal domes 38. Accordingly, it is possible to obtain the member for the illumination type push button switch 30 that has a small thickness and can further improve the visibility of key tops 3 in the dark. Further, the elastic sheet 36, in which a urethane film 4 and the silicone rubber 6 are integrated, is interposed between the key tops 3 that are adjacent to each other only in a Y direction of the keypad 31, thereby forming partitions 35. Accordingly, it is possible to improve the design and operability of the member for the illumination type push button switch 30 by using the partitions 35. Further, it is possible to obtain the member for the illumination type push button switch 30 by using the partitions 35.

Each of the key tops 3 is preferably made of a polycarbonate resin. In addition, an ornamental layer 37 is formed on the surface of each key top 3. The ornamental layer 37 has marks such as outline letters, which are formed by laser beam after a painting for light shielding is performed on the surface of each key top 3. As described above, a painting for light shielding is performed on the regions of each key top 3 except for regions corresponding to the marks. Therefore, it is possible to illuminate only the marks of each key top 3.

Fourth Embodiment

A member for a push button switch 40 according to a fourth embodiment of the present invention will be described below.

Figure 13:
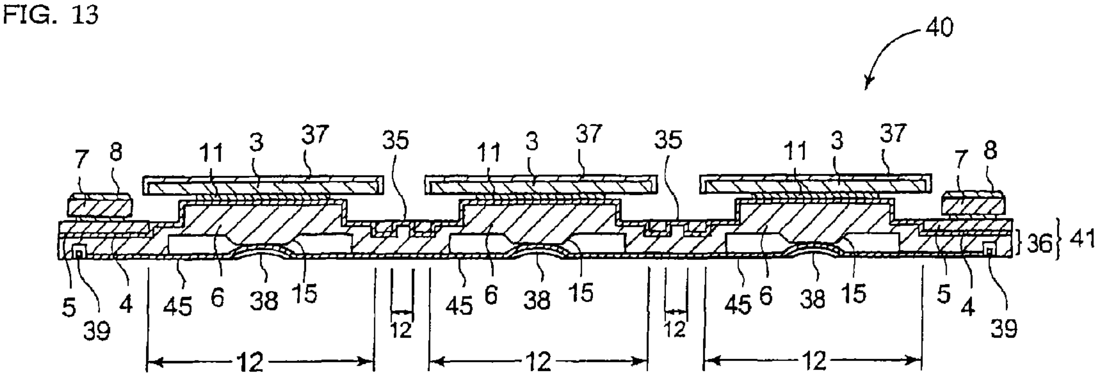
FIG. 13 is a cross-sectional view of a member for a push button switch according to a fourth embodiment of the present invention, taken along the same line as the line D-D shown in FIG. 11.

FIG. 13 is a cross-sectional view of a member for a push button switch 40 according to a fourth embodiment of the present invention, taken along the same line as the line D-D shown in FIG. 11.

According to the fourth embodiment, unlike the third embodiment, a keypad 41 includes a metal sheet 5 having holes 12, an elastic sheet 36, and a light guiding sheet 45 as shown in FIG. 13. The light guiding sheet 45 is provided between pressers 15, which are formed of a silicone rubber 6, and metal domes 38 so as to correspond to the shape of the metal domes 38. Accordingly, when light emitting diodes (hereinafter, referred to as "LEDs") are used as a light emitting member, light emitted from LEDs 39 is transmitted through the light guiding sheet 45, the silicone rubber 6, a urethane film 4, and each key top 3 in this order, and transmitted through partitions 35. Therefore, even though a small number of LEDs 39 are arranged, the marks formed on the top surfaces of the key tops 3 can be illuminated to have substantially uniform brightness.

Figure 14:
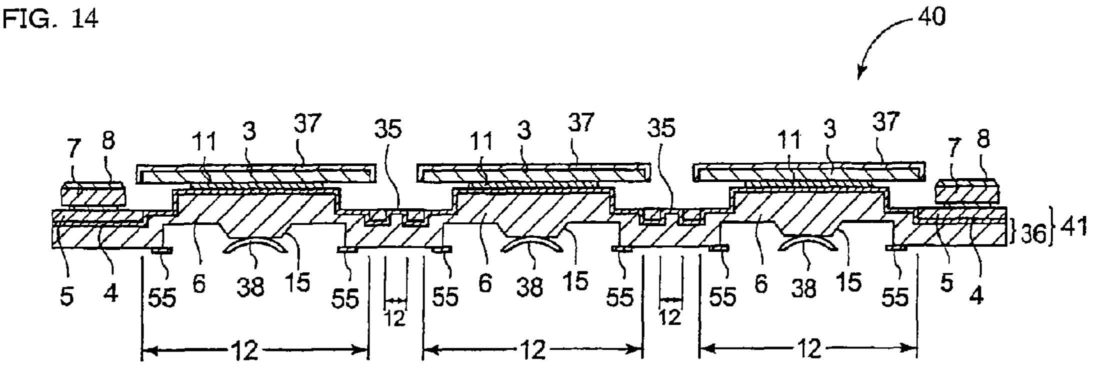
FIG. 14 is a cross-sectional view of a member for a push button switch according to a modification of the fourth embodiment of the present invention, taken along the same line as the line D-D shown in FIG. 10.

FIG. 14 is a cross-sectional view of a member for a push button switch 40 according to a modification of the fourth embodiment of the present invention, taken along the same line as the line D-D shown in FIG. 11.

As shown in FIG. 14, for example, long light guiding sheets 55 may be provided instead of the light guiding sheet 45. Accordingly, it is possible to obtain a member for a push button switch 40 that can efficiently illuminate push button switches by a small number of LED light sources.

Fifth Embodiment

A method of manufacturing a member for a push button switch according to a fifth embodiment of the present invention will be described below.

Figure 15:
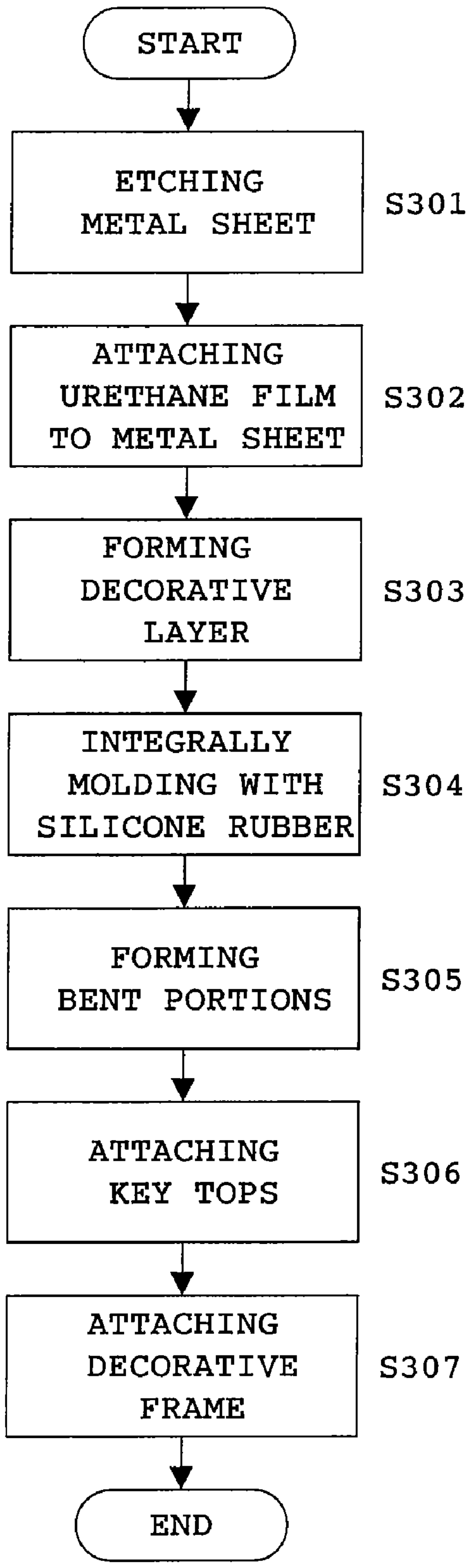
FIG. 15 is a flow chart illustrating steps of another method of manufacturing the member for the push button switch according to the first embodiment of the present invention.

FIG. 15 is a flow chart illustrating steps of another method of manufacturing the member for the push button switch 1 according to the first embodiment of the present invention. A difference between a method of manufacturing the member for the push button switch according to the fifth embodiment and the method of manufacturing the member for the push button switch according to the first embodiment is as follows: The member for the push button switch 1 is formed using a method that includes performing a hole drilling on a metal sheet 5, attaching a urethane film 4 to the metal sheet 5, and providing liquid silicone rubber 6 on the surface of the urethane film 4. The method of manufacturing the member for the push button switch 1 according to the fifth embodiment will be described below with reference to the flow chart shown in FIG. 15.

First, a metal sheet 5 is etched to form holes 12 (STEP S301). In addition, during the etching step, positioning holes 13, which are used to accurately position the metal sheet 5 in a mold, are preferably formed in the metal sheet 5. Then, the urethane film 4 is attached to the metal sheet 5 having the holes 12 (STEP S302). Even in this embodiment, a primer treatment or the like is performed on one surface of the metal sheet 5, and the urethane film 4 is then heated and pressed. Alternatively, an adhesive, which exercises an adhesive function at a normal temperature or by heating, may be used to integrate the metal sheet 5 and the urethane film 4. Further, an attaching method using a double-sided tape or an adhesive may be used to attach the urethane film 4 to the metal sheet 5.

Then, a decorative layer 10 is formed on the surface of the urethane film 4 (STEP S303). Even in this embodiment, preferably, the decorative layer 10 may be screen-printed on the surface of the urethane film 4 with urethane-based ink, polycarbonate-based ink, or polybutylene terephthalate-based ink. The decorative layer 10 decorates the urethane film 4, and improves the adhesion between a silicone rubber 6 and the urethane film 4. Further, positioning through-holes, into which positioning pins of a mold are inserted, may preferably be formed in the urethane film 4 after the formation of the decorative layer 10. Since the through-holes are formed in the urethane film 4, it is possible to secure the position accuracy of the metal sheet 5 in the mold during the manufacture of a keypad 2.

After that, liquid silicone rubber having selective adhesion is applied on the surface of the decorative layer 10, and a compression molding is performed (STEP S304). Even in this embodiment, since a compression molding is performed using the liquid silicone rubber having selective adhesion, it is possible to integrate the keypad 2 that includes the metal sheet 5, the urethane film 4, and the silicone rubber 6. Specifically, the positions of the positioning holes 13, the positioning through-holes, and the positioning pins of the mold are allowed to correspond to one another. After that, the metal sheet 5 to which attached urethane film 4 is disposed in the mold having a recess corresponding to the shape of a product. Then, liquid silicone rubber having selective adhesion (for example, X-34-1725 manufactured by Shin-Etsu Chemical Co., Ltd.) is applied on the upper surface of the urethane film 4, and a compression molding is performed. Preferable molding conditions include a temperature of 120° C. and a molding time of 3 minutes. As a result, it is possible to integrate the metal sheet 5, the urethane film 4, and the silicone rubber 6. Further, it is preferable that excess burrs be removed after the compression molding.

Subsequently, bent portions 14 of the metal sheet 5 are formed (STEP S305). The bent portions 14 may be formed using a known method, for example, pressing. In addition, the bent portions 14 are not formed in the next step of STEP S304, and may be formed after a subsequent manufacturing step, such as a step of attaching the key top 3 (STEP S306) or a step of attaching the decorative frame 7 (STEP S307). It is not necessary to form the bent portions 14 by all means.

After that, the key top 3 is attached to each of the protruding portions of the elastic sheet 16, which protrude at the holes 12 (STEP S306). Preferably, the key top 3 having an ornamental layer 9 is attached to the surface of the urethane film 4 at the position corresponding to each presser 15 through the adhesive layer 11.

Finally, the decorative frame 7 is attached to the metal sheet 5 (STEP S307). Preferably, the decorative frame 7, on which a decorative treatment is previously performed, is attached to the peripheral portion of the keypad 2 by using a double-sided tape so as to be positioned outside the key tops 3. The decorative frame 7 is preferably made of a polycarbonate resin. However, the decorative frame 7 may be made of a resin other than the polycarbonate resin, for example, an ABS resin. Further, a method of forming the print layer 8 is not particularly limited. It is not necessary to form the decorative frame 7 by all means.

Sixth Embodiment

A method of manufacturing a member for a push button switch according to a sixth embodiment of the present invention will be described below.

Figure 16:
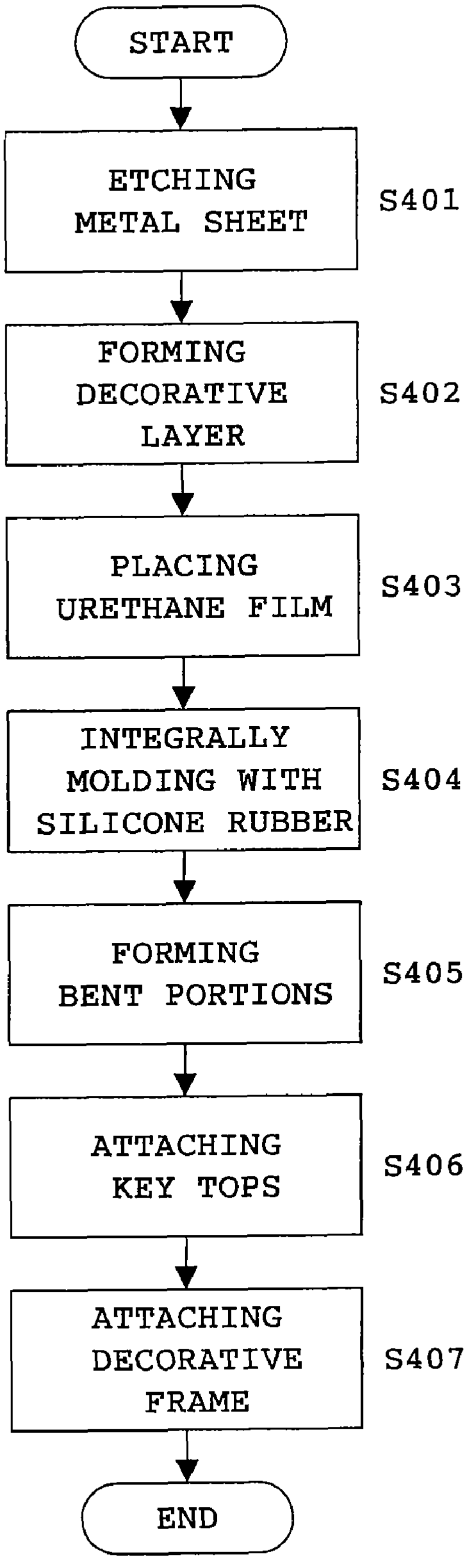
FIG. 16 is a flow chart illustrating steps of another method of manufacturing the member for the push button switch according to the first embodiment of the present invention.

FIG. 16 is a flow chart illustrating steps of another method of manufacturing the member for the push button switch 1 according to the first embodiment of the present invention. A difference between a method of manufacturing the member for the push button switch according to the sixth embodiment and the method of manufacturing the member for the push button switch according to the first embodiment is as follows: The member for the push button switch 1 is formed using a method of performing a hole drilling on a metal sheet 5, placing a urethane film 4 on the metal sheet 5, applying liquid silicone rubber on the urethane film 4, and integrally molding the metal sheet 5, the urethane film 4, and the silicone rubber 6. The method of manufacturing the member for the push button switch according to the sixth embodiment will be described below with reference to the flow chart shown in FIG. 16.

First, a metal sheet 5 is etched to form holes 12 (STEP S401). During the etching step, like the fifth embodiment, it is preferable that positioning holes 13 be formed in the metal sheet 5. Then, a decorative layer 10 is formed on the surface of a urethane film 4 (STEP S402). Like the fifth embodiment, positioning through-holes, into which positioning pins of a mold are inserted, may preferably be formed in the urethane film 4 after the formation of the decorative layer 10. After that, the urethane film 4, on which the decorative layer 10 is formed, is placed on the metal sheet 5 having the holes 12 (STEP S403). It is preferable that the urethane film 4 be placed on the metal sheet 5 after a primer treatment or the like is performed on one surface of the metal sheet 5.

After that, liquid silicone rubber having selective adhesion (for example, X-34-1725 manufactured by Shin-Etsu Chemical Co., Ltd.) is applied on the surface of the decorative layer 10, and a compression molding is performed (STEP S404). This step is the same as the compression molding step of the fifth embodiment. Since the compression molding of the liquid silicone rubber is performed, it is possible to integrate the metal sheet 5, the urethane film 4, and the silicone rubber 6. It is preferable that excess burrs be removed after the compression molding.

Subsequently, bent portions 14 of the metal sheet 5 are formed (STEP S405). The bent portions 14 are not formed in the next step of STEP S404, and may be formed after a subsequent manufacturing step, such as a step of attaching the key top 3 (STEP S406) or a step of attaching the decorative frame 7 (STEP S407).

After that, the key top 3 is attached to each of the protruding portions of the elastic sheet 16, which protrude at the holes 12 (STEP S406). Preferably, the key top 3 having an ornamental layer 9 is attached to the surface of the urethane film 4 at the position corresponding to each presser 15 through an adhesive layer 11.

Finally, the decorative frame 7 is attached to the metal sheet 5 (STEP S407). Preferably, the decorative frame 7, on which a decorative treatment is previously performed, is attached to the peripheral portion of the keypad 2 through a double-sided tape so as to be positioned outside the key tops 3.

Seventh Embodiment

A method of manufacturing a member for a push button switch according to a seventh embodiment of the present invention will be described below.

Figure 17:
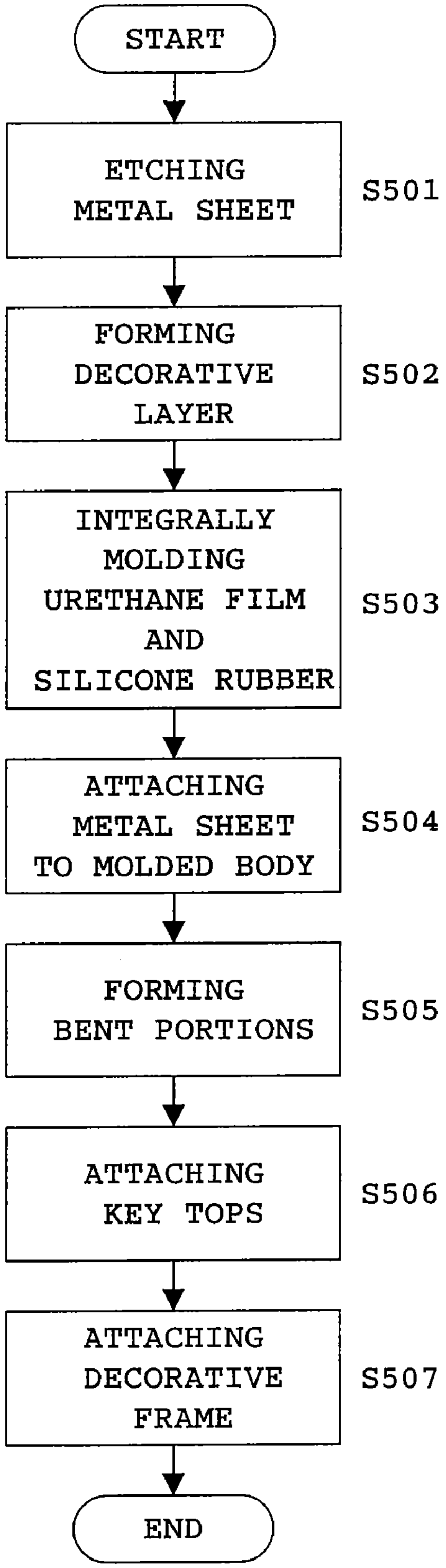
FIG. 17 is a flow chart illustrating steps of another method of manufacturing the member for the push button switch according to the first embodiment of the present invention.

FIG. 17 is a flow chart illustrating steps of another method of manufacturing the member for the push button switch 1 according to the first embodiment of the present invention. A difference between a method of manufacturing the member for the push button switch according to the seventh embodiment and the method of manufacturing the member for the push button switch according to the first embodiment is as follows: The member for the push button switch 1 is formed using a method of performing a hole drilling on a metal sheet 5, integrally molding a urethane film 4 and a silicone rubber 6, and attaching the metal sheet 5 to an elastic sheet 16 that is formed of the urethane film 4 and the silicone rubber 6. The method of manufacturing the member for the push button switch according to the seventh embodiment will be described below with reference to the flow chart shown in FIG. 17.

First, a metal sheet 5 is etched to form holes 12 (STEP S501). Then, a decorative layer 10 is formed on the surface of a urethane film 4 (STEP S502). The urethane film 4 in which the decorative layer 10 has been formed may be used in an insert molding in order to form the decorative layer 10 on the urethane film 4. After that, the urethane film 4, on which the decorative layer 10 has been formed, and the silicone rubber 6 are integrally molded (STEP S503). Specifically, positioning through-holes are formed in the urethane film 4 on which the decorative layer 10 has been formed. Then, the urethane film 4 is disposed in a mold that includes positioning pins and a recess corresponding to the shape of a product so that the positioning pins correspond to the positioning through-holes. After that, liquid silicone rubber having selective adhesion (for example, X-34-1725 manufactured by Shin-Etsu Chemical Co., Ltd.) is applied on the upper surface of the urethane film 4, and a compression molding is performed. Preferable molding conditions include a temperature of 120° C. and a molding time of 3 minutes. Concave portions having the shape corresponding to the holes 12 are formed on the inner bottom surface of the recess of the mold. Accordingly, after the compression molding, convex portions corresponding to the holes 12 are formed on an elastic sheet 16 in which the urethane film 4 and the silicone rubber 6 are integrated.

After that, the metal sheet 5 having the holes 12 is attached to the elastic sheet 16 (STEP S504). The metal sheet 5 may be attached to the elastic sheet 16 by using any attaching member of a double-sided tape, an adhesive, and the like. However, it is preferable that the metal sheet 5 be attached to the elastic sheet 16 by using a double-sided tape or a cyanoacrylate-based adhesive. When an adhesive is used to attach the metal sheet 5 to the elastic sheet 16, a condensation-based silicone adhesive or a hot-melt adhesive may be used.

Subsequently, bent portions 14 of the metal sheet 5 are formed (STEP S505). The bent portions 14 are not formed in the next step of STEP S504, and may be formed after a subsequent manufacturing step, such as a step of attaching the key top 3 (STEP S506) or a step of attaching the decorative frame 7 (STEP S507).

After that, the key top 3 is attached to each of the protruding portions of the elastic sheet 16, which protrude at the holes 12 (STEP S506). Preferably, the key top 3 having an ornamental layer 9 is attached to the surface of the elastic sheet 16 at the position corresponding to each presser 15 through an adhesive layer 11.

Finally, the decorative frame 7 is attached to the metal sheet 5 (STEP S507). Specifically, the decorative frame 7, on which a decorative treatment is previously performed, is attached to the peripheral portion of the keypad 2 by using a double-sided tape so as to be positioned outside the key tops 3.

The manufacturing steps according to each of the fifth to seventh embodiments may be used in the method of manufacturing the members for the push button switch 20, 30, and 40.

The embodiments of the member for the push button switch according to the present invention have been described above. However, the member for the push button switch according to the present invention is not limited to the above-mentioned embodiments, and can be modified in various ways.

For example, after a molding is performed using the keypad 21 of the member for the push button switch 20 obtained from the second embodiment of the present invention so that an EL sheet 25 is in surface contact with the surface of the elastic sheet 26 facing the silicone rubber 6 and integrated with the elastic sheet 26, key tops 3 may be adhered to the EL sheet 25 by an adhesive.

Meanwhile, the shape, the arrangement and the number of the key tops 3 can be changed if necessary. Accordingly, it is possible to manufacture members for various illumination type push button switches. In the respective embodiments, the elastic sheets 16, 26, and 36 may be formed using polycarbonate instead of the urethane film 4.

EXAMPLES

Examples of the present invention will be described below. However, the present invention is not limited to the examples that are to be exemplified below.

First Example

First, a primer was applied on a sheet, which has a thickness of 0.15 mm and is made of stainless steel. Then, a urethane film (Esmer-URS manufactured by Nihon Matai Co., Ltd.) having a thickness of 0.05 mm was attached to the sheet by heating and pressing. Subsequently, after transparent urethane-based ink (RUX manufactured by Seiko Advance Ltd.) was screen-printed on the entire surface of the urethane film, the transparent urethane-based ink was dried. After that, portions of the sheet made of stainless steel, which correspond to partitions between key tops, pressers, a peripheral portion of a product, and positioning holes, were etched. In addition, through-holes were formed by punching at portions of the remaining urethane film, which correspond to the positioning holes. Then, after liquid silicone rubber having selective adhesion (X-34-1725 manufactured by Shin-Etsu Chemical Co., Ltd.) was applied on a print layer made of transparent urethane-based ink, the sheet was set so that the positioning holes correspond to positioning pins of a mold having a recess corresponding to the shape of a product. Subsequently, a compression molding was performed at a temperature of 120° C. for 3 minutes. Further, bent portions were formed at the peripheral portion of the sheet, which was made of stainless steel, by a press. Then, key tops made a resin having outline letters formed by laser beam after a painting for light shielding was performed on top surfaces thereof were attached to the urethane film by an adhesive. Finally, a frame made of polycarbonate, on which a decorative printing was previously performed, was adhered to the peripheral portion of the sheet, which was made of stainless steel, by using a double-sided tape. In this way, a member for a push button switch was completely formed. The member for the push button switch, which was manufactured at low cost, had a small thickness, high durability, and excellent click feeling.

Second Example

First, a primer was applied on a sheet, which has a thickness of 0.15 mm and is made of stainless steel. Then, a urethane film (Esmer-URS manufactured by Nihon Matai Co., Ltd.) having a thickness of 0.05 mm was attached to the sheet by heating and pressing. Subsequently, after transparent urethane-based ink (RUX manufactured by Seiko Advance Ltd.) was screen-printed on the entire surface of the urethane film, the transparent urethane-based ink was dried. After that, portions of the sheet made of stainless steel, which correspond to pressers, a peripheral portion of a product, and positioning holes, were etched. In addition, through-holes were formed by punching at portions of the remaining urethane film, which correspond to the positioning holes. Then, the sheet made of stainless steel, which was integrated with the urethane film, was disposed in a mold that included a recess corresponding to the shape of the product. In addition, liquid silicone rubber (X-34-1725 manufactured by Shin-Etsu Chemical Co., Ltd.) was provided on the urethane-based ink, and an injection molding was performed. Further, bent portions were formed at the peripheral portion of the sheet, which was made of stainless steel, by a press. Then, key tops made a resin having outline letters formed by laser beam after a painting for light shielding was performed on top surfaces thereof were attached to the urethane film by an adhesive. Finally, a frame made of polycarbonate, on which a decorative printing was previously performed, was adhered to the peripheral portion of the sheet, which was made of stainless steel, by using a double-sided tape. In this way, a member for a push button switch was completely formed. The member for the push button switch, which was manufactured at low cost, had a small thickness, high durability, and excellent click feeling.

The present invention can be utilized in an industry where a member for a push button switch is manufactured or used.

The present invention has been described in the context of a number of embodiments and variations thereof. It is, however, appreciated that other expedients known to those skilled in the art may be employed without departing from the spirit of the invention. Therefore, it is intended that the appended claims be interpreted as including the embodiments described herein, the alternatives mentioned above, and all equivalents thereto.

What is claimed is:

1. A member for a push button switch comprising:

one or more key tops;

a metal sheet including at least holes that correspond to positions of the key tops; and an elastic sheet that is disposed on the metal sheet so as to be positioned on the same side as or opposite side to the key tops, the elastic sheet being fitted into the holes and coming in contact with the key tops at positions of the holes, wherein the elastic sheet includes a urethane film and a silicone rubber, which are laminated in a thickness direction of the metal sheet and which extend at least for the entire length and width of that portion of the elastic sheet fitted into the holes.

2. The member for the push button switch according to claim 1, wherein the elastic sheet is interposed between adjacent key tops so as to form partitions.

3. The member for the push button switch according to claim 1, wherein a decorative layer is provided between the urethane film and silicone rubber.

4. The member for the push button switch according to claim 1, wherein a decorative frame is formed on the metal sheet or the elastic sheet so as to be positioned outside the key tops.

5. The member for the push button switch according to claim 1, wherein a light emitting member is disposed below the key tops.

6. The member for the push button switch according to claim 1, wherein a part of peripheral portions of the metal sheet are bent in a direction opposite to the key tops.

* * * * *